US012742601B2

(12) United States Patent
Hatanaka et al.

(10) Patent No.: US 12,742,601 B2
(45) Date of Patent: Sep. 22, 2026

(54) JOINT UNIT

(71) Applicant: Nidec Corporation, Kyoto (JP)

(72) Inventors: Koji Hatanaka, Kyoto (JP); Takaya Okuno, Kyoto (JP); Genki Horiguchi, Kyoto (JP); Takehito Tamaoka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 68 days.

(21) Appl. No.: 18/678,205

(22) Filed: May 30, 2024

(65) Prior Publication Data

US 2024/0401891 A1 Dec. 5, 2024

(30) Foreign Application Priority Data

May 31, 2023 (JP) ................................ 2023-089961

(51) Int. Cl.
*F28F 9/02* (2006.01)
*F16L 39/02* (2006.01)

(52) U.S. Cl.
CPC ............ *F28F 9/0253* (2013.01); *F16L 39/02* (2013.01)

(58) Field of Classification Search
CPC ......... F28F 9/0253; F16L 39/02; F17D 1/082; F17D 3/01; H05K 7/20272
USPC ........................................... 285/124.3, 124.4
See application file for complete search history.

(56) References Cited

U.S. PATENT DOCUMENTS 3,869,152 A * 3/1975 DeVincent .............. F16L 39/00 285/256
5,342,098 A * 8/1994 Wilkins .................. F16L 37/56 285/309
5,687,993 A * 11/1997 Brim ....................... F16L 39/02 285/120.1
7,073,825 B2 * 7/2006 Takada ................ F15B 13/0839 137/884
2002/0167171 A1 * 11/2002 Becker .................. E03C 1/0403 285/124.1
2016/0356558 A1 * 12/2016 Franz ................. H05K 7/20272

FOREIGN PATENT DOCUMENTS

CN 216772366 U 6/2022

* cited by examiner

*Primary Examiner* — James M Hewitt, II
(74) *Attorney, Agent, or Firm* — Keating & Bennett, LLP

(57) ABSTRACT

A joint assembly includes a joint including a flow path penetrating therethrough, and a fixing portion to which the joint is attached. The joint includes at least two mounting portions to which a tube is mounted, and an intermediate portion located between the at least two mounting portions. The fixing portion extends in a first intersecting direction intersecting the flow path and abuts on the intermediate portion.

11 Claims, 12 Drawing Sheets

JOINT UNIT

CROSS-REFERENCE TO RELATED APPLICATIONS

The present application claims priority under 35 U.S.C. § 119 to Japanese Patent Application No. 2023-089961, filed on May 31, 2023, the entire contents of which are hereby incorporated herein by reference.

1. FIELD OF THE INVENTION

The present disclosure relates to a joint assembly.

2. BACKGROUND

A water-cooled structure according to the background art includes a chassis, a support member, a water supply pipe, and a drain pipe. The support member is installed near the slot of the chassis in the chassis. A mounting position is defined in the support member. The water supply pipe and the drain pipe are attached to mounting positions. Each of the water supply pipe and the drain pipe extends from the outside of the chassis to the inside of the chassis through the mounting position.

However, in the background art, the water supply pipe and the drain pipe are in direct contact with the support member in the mounting position. Therefore, a load is likely to be applied to portions of the water supply pipe and the drain pipe that are in direct contact with the support member. As a result, the water supply pipe and the drain pipe are easily damaged in the vicinity of the mounting position.

SUMMARY

A joint assembly according to an example embodiment of the present disclosure includes a joint and a fixing portion. The joint includes a flow path penetrating the joint. The joint is attached to the fixing portion. The joint includes at least two mounting portions and an intermediate portion. A tube is mounted to the at least two mounting portions. The intermediate portion is located between the at least two mounting portions. The fixing portion extends in a first intersecting direction intersecting the flow path and abuts on the intermediate portion.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 6 is an enlarged view of the joint illustrated in FIGS. 4 and 5.

FIG. 9 is an enlarged view of the joint assembly illustrated in FIG. 8.

DETAILED DESCRIPTION

Figure 1:
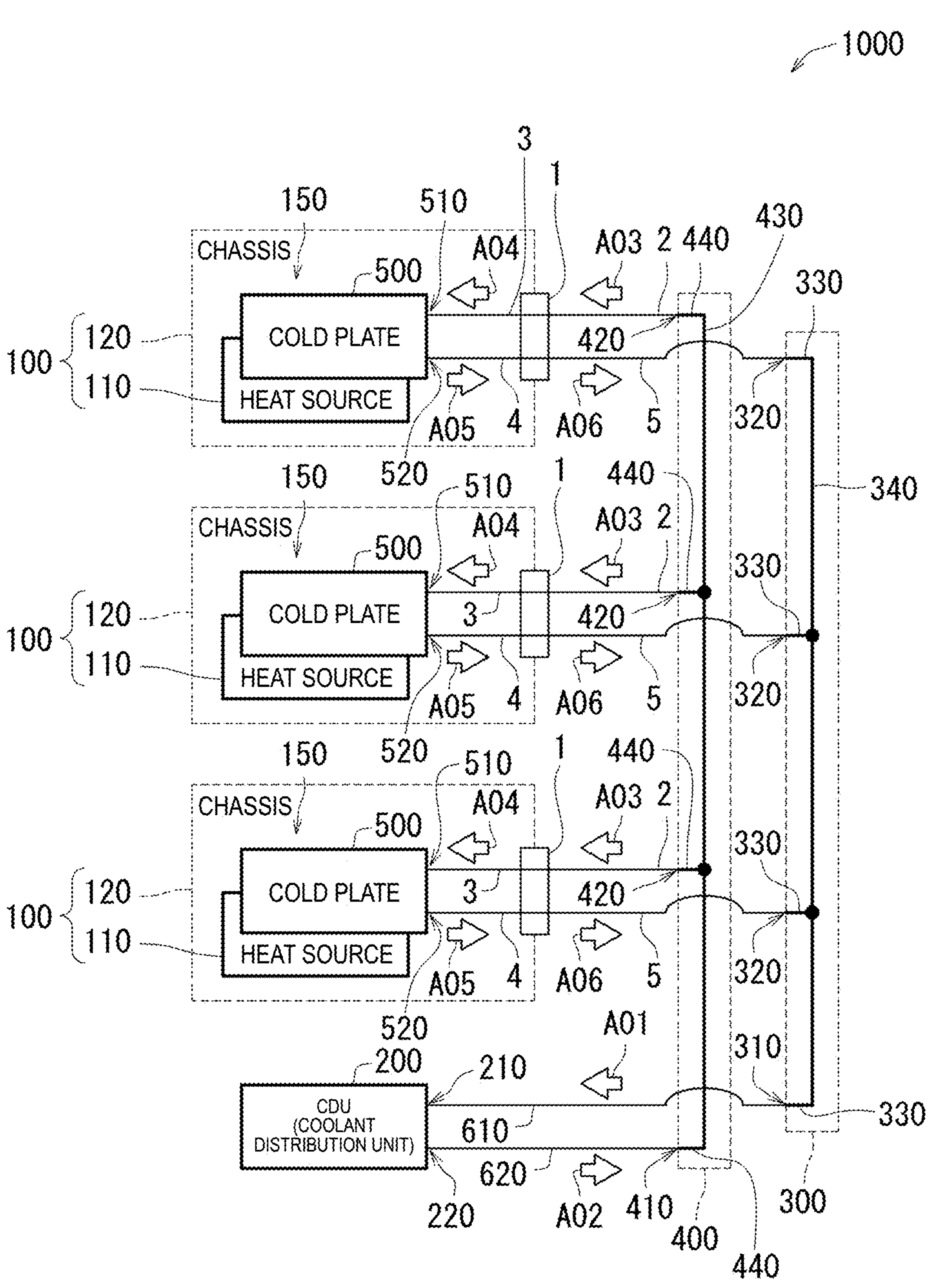
FIG. 1 is a block diagram illustrating a configuration of a cooling system according to an example embodiment of the present disclosure.

Hereinafter, example embodiments of the present disclosure will be described with reference to the drawings. In the drawings, the same or corresponding parts are denoted by the same reference numeral and description thereof will not be repeated.

In each example embodiment, a first direction Z, a second direction X, and a third direction Y intersecting each other are appropriately described for easy understanding. In each example embodiment, the term "intersecting" includes crossing lines, planes, or lines and planes at a right angle to each other, and crossing each other at a non-right angle within a range of a slight difference (tolerance, error, or the like).

Further, one side and the other side of the first direction Z are referred to as one of one side Z1 of the first direction and the other side Z2 of the first direction, respectively. One side and the other side of the second direction X are referred to as one side X1 of the second direction and the other side X2 of the second direction, respectively. One side and the other side of the third direction Y are referred to as one side Y1 of the third direction and the other side Y2 of the third direction, respectively. However, the first direction Z, the second direction X, and the third direction Y are merely defined for convenience of description.

FIG. 1 is a block diagram illustrating a configuration of a cooling system 1000. The cooling system 1000 cools the one or more heat sources 110 by circulating a refrigerant. FIG. 1 illustrates three heat sources 110.

The refrigerant is, for example, a coolant. Examples of the coolant include antifreeze liquid and pure water. A typical example of antifreeze liquid is an ethylene glycol aqueous solution or a propylene glycol aqueous solution.

The heat source 110 is typically an electronic component. The electronic component operates by power supply and generates heat. Specifically, the electronic component is a component constituting an electronic device 100, and is accommodated in a chassis 120 of the electronic device 100. In addition, the electronic component may be attached to the chassis 120. The electronic component illustratively includes an electrolytic capacitor, a power semiconductor module, or a printed circuit board. The electronic device 100 is a rack mounted server or a blade server. The electronic device 100 may also be a projector, a personal computer, or a display.

The cooling system 1000 includes, as components, a CDU 200, a collection manifold 300, a distribution manifold 400, and a pair of two cold plates 500. The refrigerant circulates between the CDU 200, the collection manifold 300, the distribution manifold 400, and the respective cold plates 500 as indicated by arrows A01 to A06.

FIG. 1 illustrates three sets of pairs of two cold plates 500. At least one cold plate 500 may be provided. In this case, the cooling system 1000 may not include the collection manifold 300 and the distribution manifold 400.

In each example embodiment, each cold plate 500 is used with the CDU 200. That is, FIG. 1 illustrates an example embodiment of each cold plate 500. Each cold plate 500 may be distributed in the market independently of a joint assembly 1 and flow path members 2 to 5 described later.

Hereinafter, the components of the cooling system 1000 will be described in detail.

The CDU 200 has an inlet 210. One end of a flow path member 610 is connected to the inlet 210. The flow path member 610 connects an outlet 310 of the collection manifold 300 and the inlet 210 of the CDU 200 such that the refrigerant can flow therebetween. The flow path member 610 is a tube made of a specific material. The specific material is a synthetic resin or a metal. Each of the flow path members 620 and 2 to 5 described later may be made in the same manner as the flow path member 610 or may be manufactured by a method different from the flow path member 610. The high-temperature refrigerant flows from the collection manifold 300 into the inlet 210 via the flow path member 610 (see arrow A01).

The CDU 200 further includes a cooling device and fluid machinery (both not shown), and an outlet 220. The cooling device is typically an air-cooled or water-cooled radiator. The fluid machinery is various pumps. One end of the flow path member 620 is connected to the outlet 220. The flow path member 620 connects the outlet 220 of the CDU 200 and an inlet 410 of the distribution manifold 400 such that the refrigerant can flow therebetween. The CDU 200 cools and pressure-feeds the inflowing refrigerant by the cooling device and the fluid machinery. When the refrigerant is pressure-fed, the low-temperature refrigerant flows out from the outlet 220 of the CDU 200. The refrigerant flows through the flow path member 620 and is sent toward the inlet 410 (see arrow A02).

By the action of the CDU 200, the refrigerant circulates in the cooling system 1000 as indicated by arrows A01 to A06.

The collection manifold 300 has a plurality of the individual flow paths 330 and a common flow path 340. The refrigerant can flow through each of the plurality of individual flow paths 330 and the common flow path 340. One end of each of the individual flow paths 330 is connected to the common flow path 340 so that the refrigerant can flow therethrough. The other end of one of the plurality of individual flow paths 330 is used as the outlet 310 of the refrigerant in the collection manifold 300. The outlet 310 is connected to the other end of the flow path member 610 so that the refrigerant can flow therethrough. The other end of the remaining individual flow path 330 can be used as an inlet 320 of the refrigerant in the collection manifold 300. The plurality of inlets 320 are connected to one ends of the plurality of flow path members 5 so that the refrigerant can flow therethrough. Therefore, the high-temperature refrigerant flowing into each of the inlets 320 from the flow path member 5 connected thereto joins in the common flow path 340, and flows out from the outlet 310 to the flow path member 610.

The distribution manifold 400 has a common flow path 430 and a plurality of individual flow paths 440. The refrigerant can flow through each of the common flow path 430 and the plurality of individual flow paths 440. One end of each of the individual flow paths 440 is connected to the common flow path 430 so that the refrigerant can flow therethrough. The other end of one of the plurality of individual flow paths 440 is used as the inlet 410 of the refrigerant in the distribution manifold 400. The other end of the flow path member 620 is connected to the inlet 410. The other end of the remaining individual flow path 440 can be used as an outlet 420 of the refrigerant in the distribution manifold 400. Each outlet 420 is connected to one end of the flow path member 2 so that the refrigerant can flow therethrough. Therefore, the low-temperature refrigerant flowing into the inlet 410 flows from one individual flow path 440 to the common flow path 430, is divided by the plurality of remaining individual flow paths 440, and then flows out from each outlet 420 to the flow path member 2.

Each cold plate 500 is arranged in direct thermal contact with the heat source 110 in the chassis 120. Each cold plate 500 may be arranged in thermal contact with the heat source 110 via a thermally conductive sheet (not shown). Each cold plate 500 has an inlet 510 of the refrigerant and an outlet 520 of the refrigerant. A refrigerant flow path (not shown) extending from the inlet 510 to the outlet 520 is formed inside the cold plate 500. The low-temperature refrigerant flows into the inlet 510 from the flow path member 3 (described later) (see arrow A04). The refrigerant flows in the cold plate 500 from the inlet 510 toward the outlet 520 in the refrigerant flow path of the cold plate 500. Accordingly, the heat generated by the heat source 110 moves to the refrigerant flowing in the cold plate 500 in thermal contact with the heat source 110. As a result, the heat source 110 is cooled, and the temperature of the refrigerant becomes high. The high-temperature refrigerant flows out from the outlet 520 to the flow path member 4 (described later) (see arrow A05).

Figure 2:
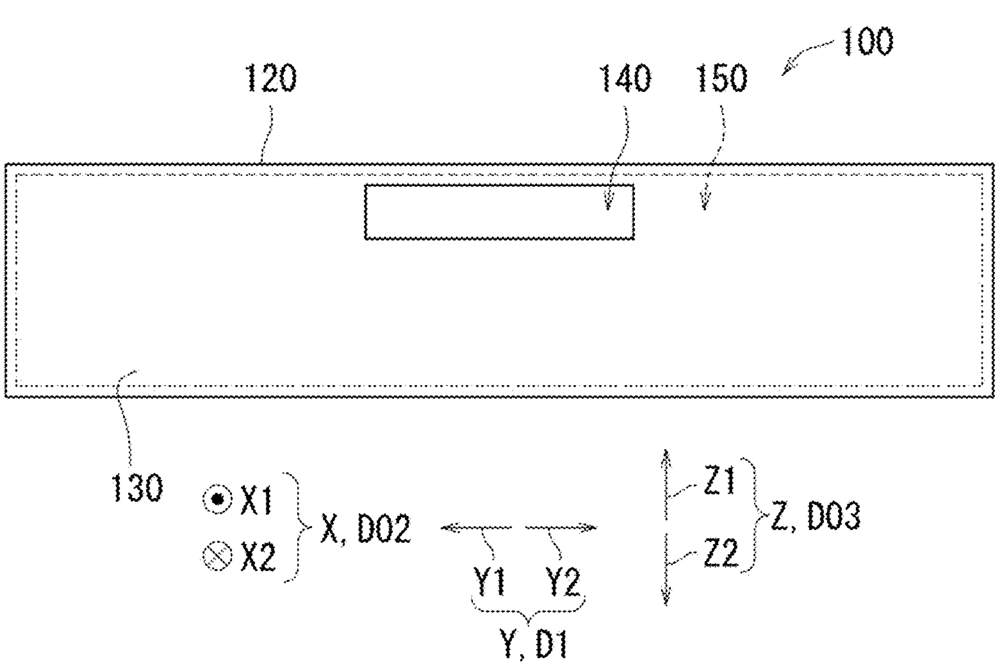
FIG. 2 is a schematic diagram illustrating a part of a chassis of an electronic device illustrated in FIG. 1.

FIG. 2 is a schematic diagram illustrating a part of the chassis 120 of the electronic device 100 illustrated in FIG. 1. As illustrated in FIG. 2, the chassis 120 typically has a substantially rectangular parallelepiped shape. In the chassis 120, the dimension in the first direction Z is smaller than the dimension in the third direction Y. The chassis 120 includes an exterior panel 130. The exterior panel 130 has a plate shape. In the example embodiment, the exterior panel 130 faces the one side X1 of the second direction and expands in the first direction Z and the third direction Y. At least one opening 140 is formed in the exterior panel 130. In the first example embodiment, the opening 140 has a substantially rectangular shape that is longer in the third direction Y than in the first direction Z in plan view from the second direction X. The opening 140 penetrates the exterior panel 130 in the second direction X. Therefore, an internal space 150 of the chassis 120 is connected to the external space of the chassis 120 through the opening 140. The internal space 150 accommodates the cold plate 500 and the heat source 110.

FIG. 1 will be referred to again. In the refrigerant flow path (see arrows A01 to A06) of the cooling system 1000, each cold plate 500, the collection manifold 300, and the distribution manifold 400 are connected by the joint assembly 1 and the flow path members 2 to 5 so that the refrigerant can flow therethrough. The joint assembly 1 is attached to the chassis 120 so as to close the opening 140 (see FIG. 2).

Figure 3:
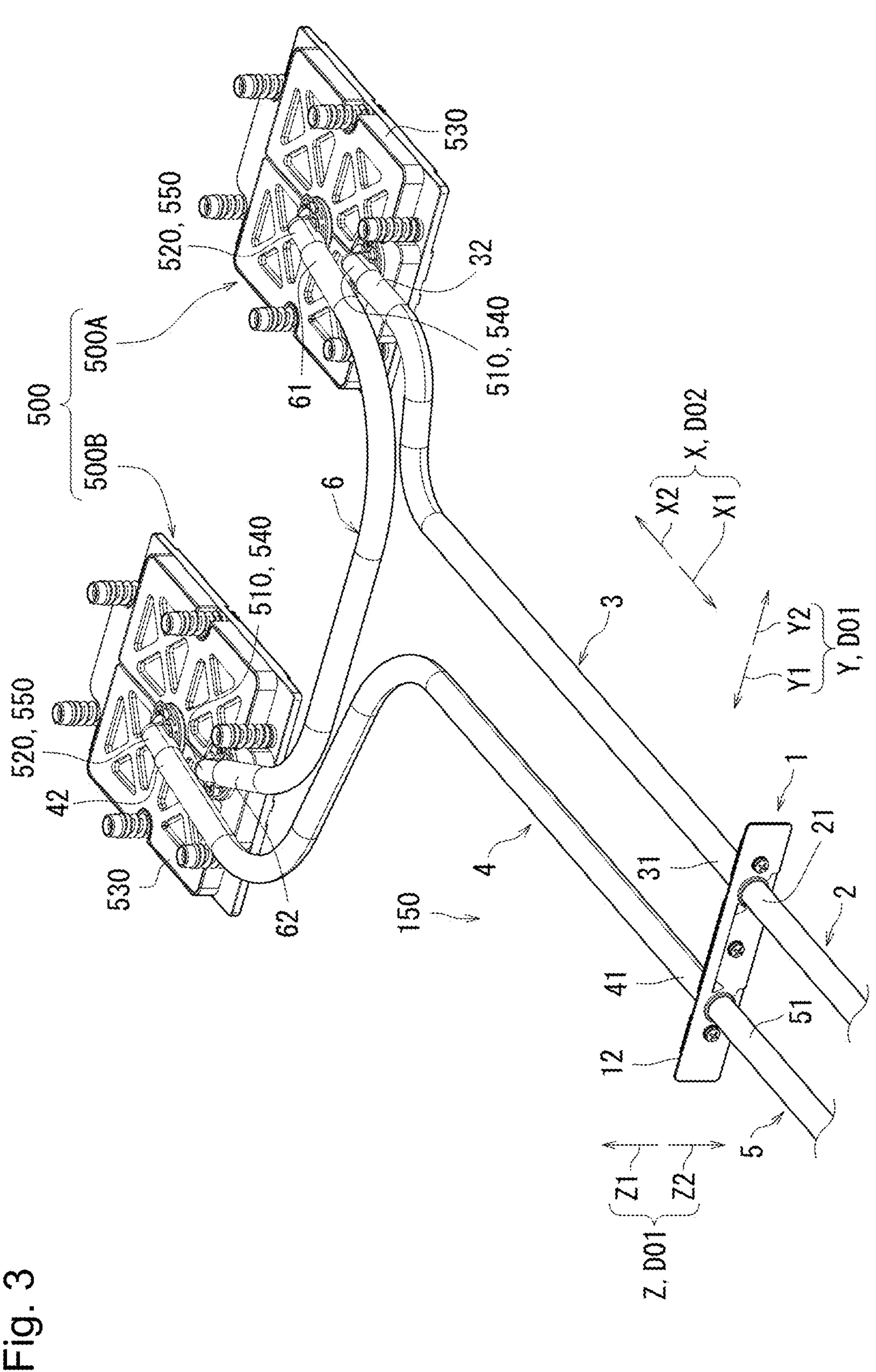
FIG. 3 is a perspective view illustrating a joint assembly and its periphery according to a first example embodiment of the present disclosure.
Figure 4:
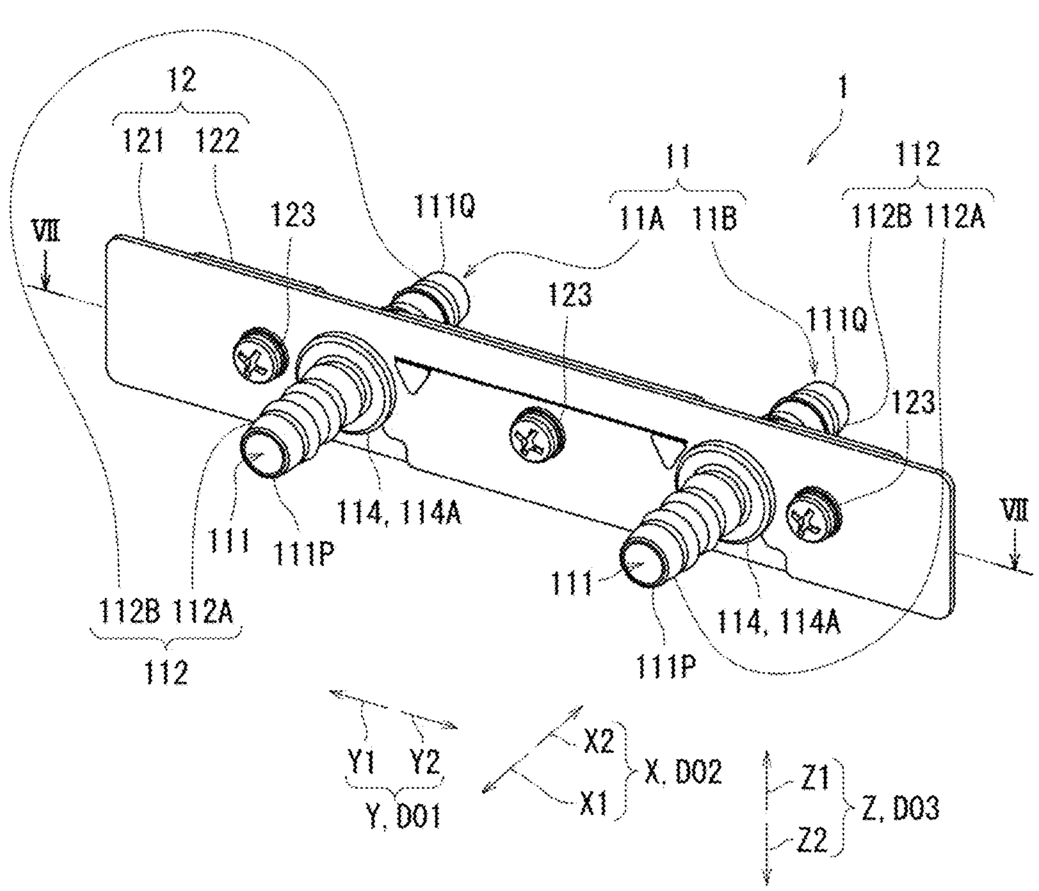
FIG. 4 is an enlarged view of the joint assembly illustrated in FIG. 3.
Figure 5:
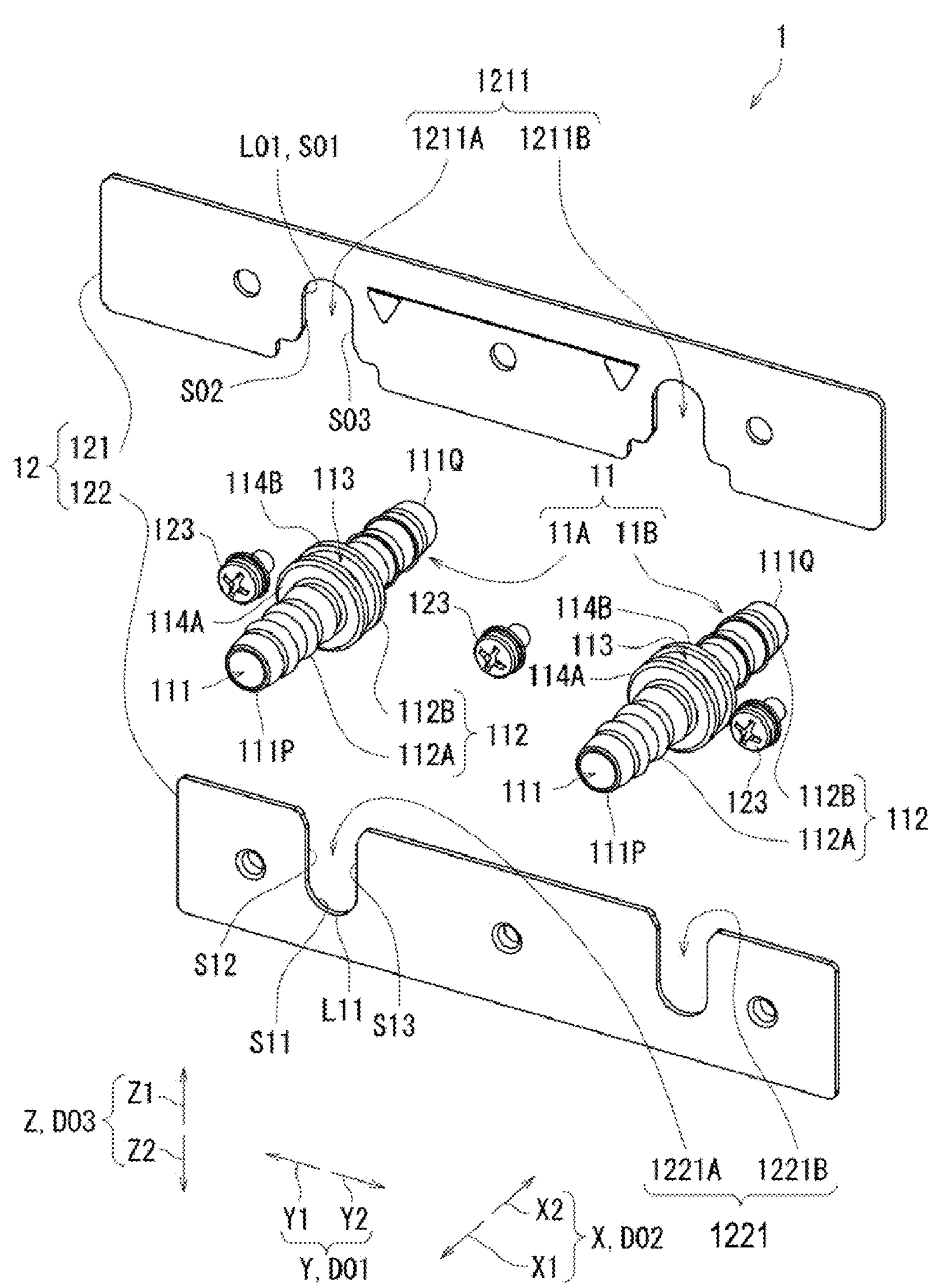
FIG. 5 is an exploded view of the joint assembly illustrated in FIG. 3.
Figure 6:
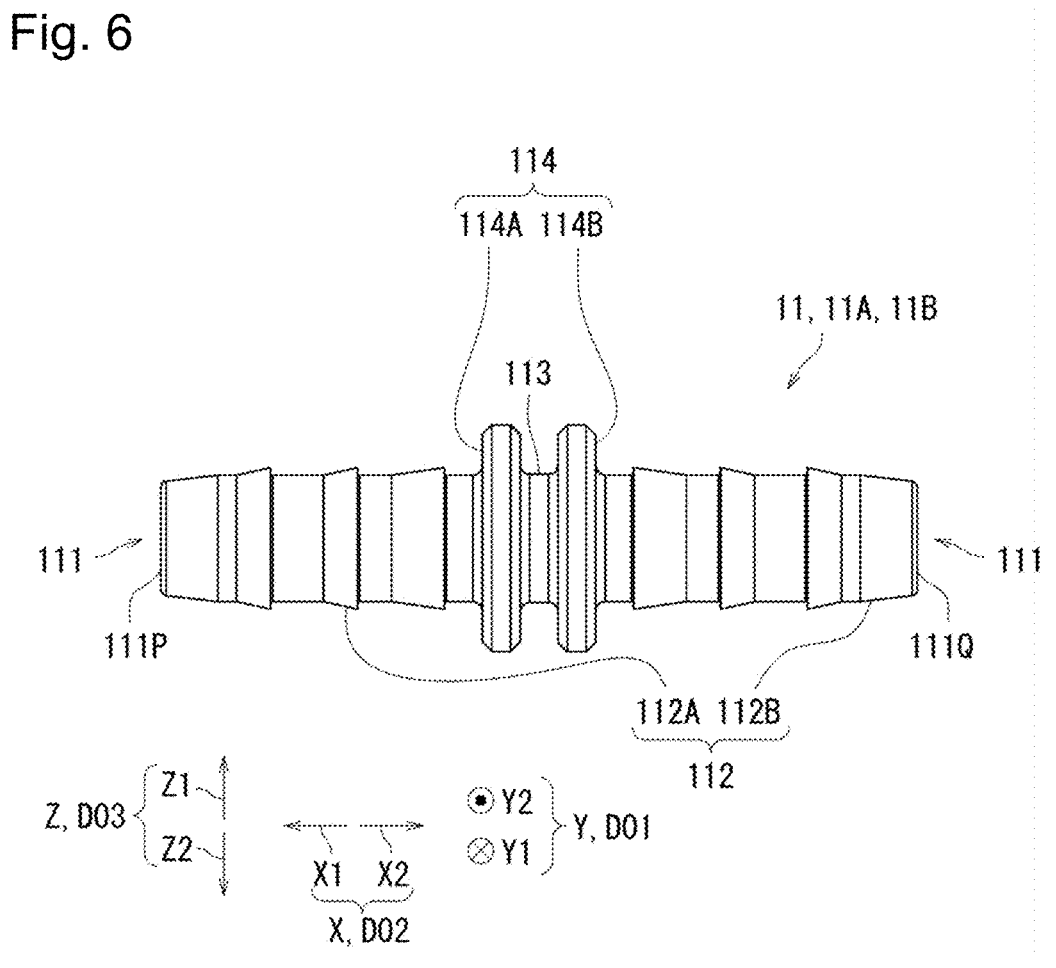
Figure 7:
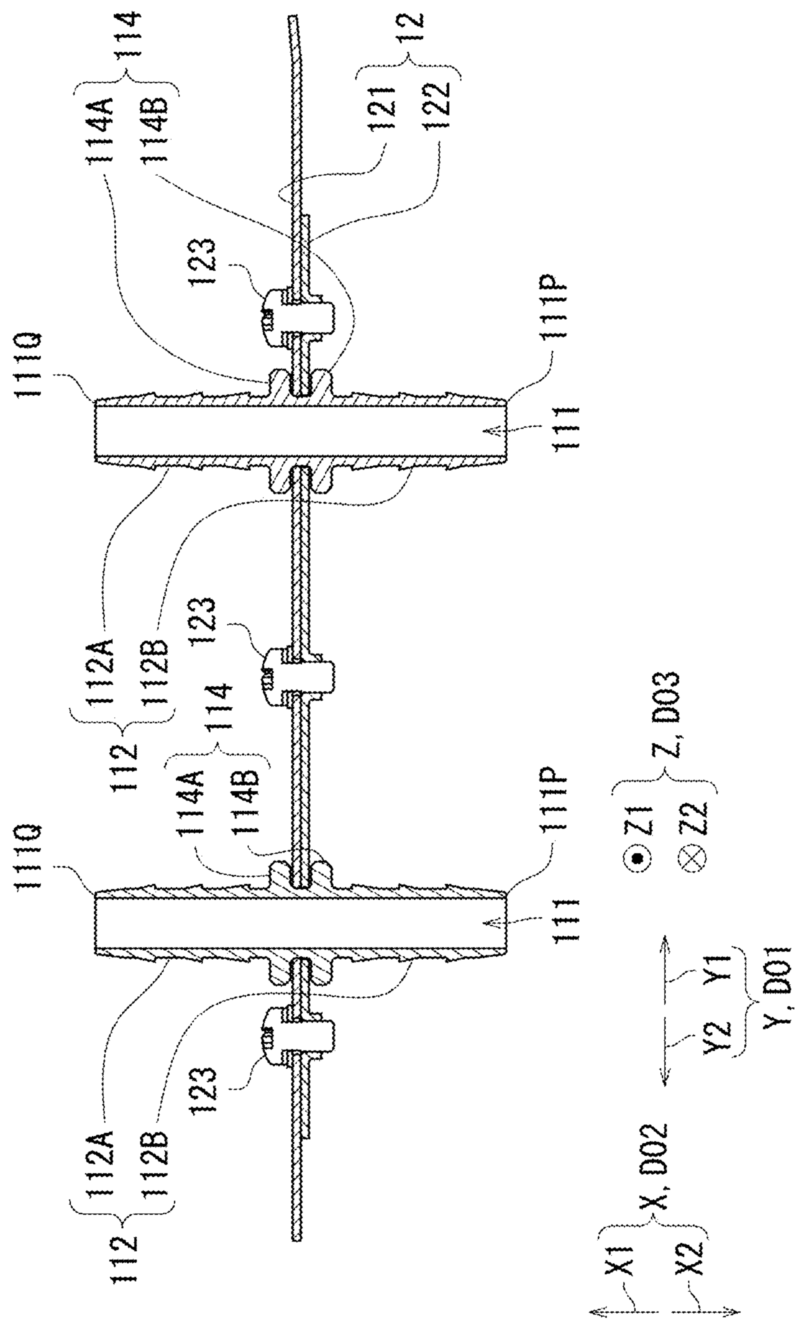
FIG. 7 is a cross-sectional view of the joint assembly taken along line VII-VII in FIG. 4.

FIG. 3 is a perspective view illustrating the joint assembly 1 and its periphery according to the first example embodiment. FIG. 4 is an enlarged view of the joint assembly 1 illustrated in FIG. 3. FIG. 5 is an exploded view of the joint assembly 1 illustrated in FIG. 3. FIG. 6 is an enlarged view of a joint 11 illustrated in FIGS. 4 and 5. FIG. 7 is a view of a cross section of the joint assembly 1 taken along line VII-VII in FIG. 4 as viewed from the one side Z1 in the first direction.

Prior to description of the joint assembly 1, the cold plate 500 will be described in more detail. As illustrated in FIG. 3, the pair of two cold plates 500 includes cold plates 500A and 500B. Each of the cold plates 500A and 500B is accommodated in the internal space 150 together with the heat source 110 (see FIG. 1). Each of the cold plates 500A and 500B includes a chassis 530 and fluid connectors 540 and 550. Each chassis 530 is provided with the fluid connectors 540 and 550. The inlet 510 and the outlet 520 each are formed in the fluid connectors 540 and 550.

As illustrated in FIGS. 3 to 7, the joint assembly 1 includes at least one joint 11 and a fixing portion 12 as components. In the first example embodiment, the at least one joint 11 is two joints 11A and 11B.

Hereinafter, unless otherwise specified, the term "joint assembly 1" means the joint assembly 1 in a state of being attached to the chassis 120. The terms "joint 11" and "fixing portion 12" respectively mean the joint 11 and the fixing portion 12 in a state of being attached to chassis 120. The same applies to the second example embodiment described later.

Each joint 11 is typically made of a hard synthetic resin and has the same shape. Thus, each joint 11 is made at low cost. Each joint 11 may be made of metal. In addition, each joint 11 may have a different shape.

Each joint 11 has a shape elongated in the second direction X (see FIGS. 4 to 6 in particular). The joint 11 has a flow path 111 penetrating therethrough. Specifically, the flow path 111 penetrates between an end face 111P of the joint 11 on one side X1 of the second direction and an end face 1110 of the joint 11 on the other side X2 of the second direction. The flow path 111 extends along the second direction X in the joint 11 (see FIG. 7 in particular).

Each joint 11 has at least two mounting portions 112 and an intermediate portion 113. In the first example embodiment, the at least two mounting portions 112 are two mounting portions 112A and 112B.

The mounting portion 112A is located away from the mounting portion 112B on one side X1 of the second direction. That is, the mounting portions 112A and 112B are arranged along the second direction X. The flow path members 2 to 5 are attached to the four mounting portions 112. The flow path members 2 to 5 are examples of "tube" in the present disclosure. Specifically, the flow path members 2 to 5 are directly attached to the four mounting portions 112. More specifically, the other end 51 of the flow path member 5 is directly attached to the mounting portion 112A of the joint 11A. One end 41 (see FIG. 3) of the flow path member 4 is directly mounted to the mounting portion 112B (see FIG. 4) of the joint 11A. The other end 42 of the flow path member 4 is mounted to the fluid connector 550 of the cold plate 500B (see FIG. 3). The other end 21 (see FIG. 3) of the flow path member 2 is directly mounted to the mounting portion 112A of the joint 11B. One end 31 (see FIG. 3) of the flow path member 3 is directly mounted to the mounting portion 112B (see FIG. 4) of the joint 11B. The other end 32 of the flow path member 3 is mounted to the fluid connector 540 of the cold plate 500A (see FIG. 3). One end 61 and the other end 62 of the flow path member 6 are mounted to the fluid connector 550 of the cold plate 500A and the fluid connector 540 of the cold plate 500B. As a result, the refrigerant can flow from the outlet 520 of the cold plate 500A to the inlet 510 of the cold plate 500B.

As illustrated in FIGS. 4 to 7, a recess and a protrusion are formed on the outer peripheral surface of each mounting portion 112 so that the mounted flow path members 2 to 5 do not come off. Specifically, the recess and the protrusion are alternately arranged in the second direction X.

In each joint 11, the intermediate portion 113 is located between the at least two mounting portions 112. In the first example embodiment, intermediate portion 3 is located between the mounting portions 112A and 112B in the second direction X. The outer peripheral surface of the intermediate portion 113 has a substantially cylindrical shape. In the first example embodiment, the mounting portions 112A and 112B may have shapes symmetrical to each other in the second direction X with respect to the intermediate portion 113. Note that the mounting portions 112A and 112B may have asymmetric shapes with respect to the intermediate portion 113.

Each joint 11 is attached to the fixing portion 12. The fixing portion 12 extends in a first intersecting direction D01 where the flow path 111 intersects. In the first example embodiment, the first intersecting direction D01 is a direction along the third direction Y. Specifically, the fixing portion 12 has a plate shape extending in the first direction Z and the third direction Y. The fixing portion 12 abuts on the intermediate portion 113 of each joint 11 (see in particular FIGS. 4, 5, and 7). That is, the fixing portion 12 abuts on the intermediate portion 113 of the joint 11 to support each joint 11. Therefore, even when the fixing portion 12 vibrates or when an external force is applied to the flow path members 2 to 5 and the flow path members 2 to 5 is pulled, the fixing portion 12 does not directly abut on the flow path members 2 to 5. Therefore, the flow path members 2 to 5 is less likely to be damaged.

The fixing portion 12 is attached to the chassis 120 so as to close the opening 140 (see FIG. 2) in the following states (a) to (c) (see FIG. 1). (a) is a state in which each cold plate 500 is accommodated in the internal space 150 of the chassis 120. (b) is a state in which one end of the flow path member 2 is connected to the outlet 420. (c) is a state in which one end of the flow path member 5 is connected to the inlet 320. Since the fixing portion 12 is attached to the chassis 120, the vibration of the exterior panel 130 of the electronic device 100 is directly transmitted to the fixing portion 12. However, the fixing portion 12 abuts on the intermediate portion 113 of the joint 11 to support each joint 11. Therefore, since the vibration of the exterior panel 130 is not directly transmitted to the flow path members 2 to 5, the flow path members 2 to 5 are hardly damaged by the vibration.

In addition, the flow path members 3 and 4 and the flow path members 5 and 6 are not directly connected. Therefore, even when an external force is applied to the flow path members 5 and 6 outside the chassis 120, the external force is less likely to be transmitted to the flow path members 3 and 4 disposed in the chassis 120. That is, the flow path members 3 and 4 are difficult to move in the chassis 120. As a result, the flow path members 3 and 4 are prevented from coming into contact with other components in the chassis 120.

Preferably, further has at least one protruding portion 114. In the first example embodiment, the at least one protruding portion 114 is at least two protruding portions 114A and 114B. The at least one protruding portion 114 protrudes in the first intersecting direction D01 from between the intermediate portion 113 and one of the at least two mounting portions 112. In particular, the protruding portion 114A protrudes in the first intersecting direction D01 from between the intermediate portion 113 and the mounting portion 112A. The protruding portion 114B protrudes in the first intersecting direction D01 from between the intermediate portion 113 and the mounting portion 112B. Since each protruding portion 114 and the fixing portion 12 abut on each other, each joint 11 does not move in an extending direction D02 along the flow path 111 (particularly see FIG. 7). The extending direction D02 is a direction along the second direction X.

More specifically, the protruding portions 114A and 114B protrude annularly or in a flange shape in the first intersecting direction D01 from the entire circumference of the outer peripheral surface of the intermediate portion 113.

When each joint 11 has the protruding portions 114A and 114B, the fixing portion 12 is located between the two protruding portions 114A and 114B and abuts on the intermediate portion 113 located between them. Therefore, each joint 11 is also easily located in a second intersecting direction D03 intersecting the first intersecting direction D01 and the extending direction D02 (particularly see FIG. 4). In the example embodiment, the second intersecting direction D03 is along the first direction Z.

More specifically, the fixing portion 12 also abuts on the two protruding portions 114A and 114B. Therefore, the movement (positional displacement) of each joint 11 in the extending direction D02 is further suppressed.

The fixing portion 12 has a metal plates 121 and 122 (see FIG. 5 in particular). The metal plates 121 and 122 are examples of a “first metal plate” and a “second metal plate” in the present disclosure. The metal plates 121 and 122 have a plate shape extending in the first intersecting direction D01. In the first example embodiment, the metal plates 121 and 122 are made of metal and extends in the first direction Z and the third direction Y. In the first example embodiment, the dimension of each of the metal plates 121 and 122 in the first direction Z is substantially the same as the dimension of the opening 140 in the same direction. The dimension of each of the metal plates 121 and 122 in the third direction Y is substantially the same as the dimension of the opening 140 in the same direction. The dimension of each of the metal plates 121 and 122 in the second direction X is substantially the same as half of the interval between the protruding portions 114A and 114B in the same direction. The dimension of each of the metal plates 121 and 122 in the second direction X is substantially the same as half of the interval of the intermediate portion 113 in the same direction.

The metal plate 121 includes receiving portions 1211A and 1211B as the same number of receiving portions 1211 as the joints 11. The metal plate 122 includes receiving portions 1221A and 1221B as the same number of receiving portions 1221 as the joints 11. The receiving portions 1211 and 1221 are examples of a “first receiving portion” and a “second receiving portion” of the present disclosure. The receiving portions 1211 and 1221 receive the intermediate portion 113 from one side and the other side of the second intersecting direction D03 intersecting the flow path 111, respectively (particularly see FIGS. 4 and 5). Thus, the joint 11 can be supported by the receiving portions 1211 and 1221 with a simple structure.

Specifically, as clearly illustrated in FIG. 5, each of the receiving portions 1211 and 1221 is formed by notching and has the following shape. The receiving portion 1211A is a curved surface S01 forming an arc L01 in plan view from the second direction X at an end portion on one side Z1 in the first direction. The arc L01 faces the other side Z2 of the first direction. The central angle of the arc L01 is 180°. The chord of the arc L01 extends along the third direction Y and has substantially the same length as the diameter of the outer peripheral surface of the intermediate portion 113 (see FIG. 6). The receiving portion 1211A further includes side surfaces S02 and S03 extending from both ends of the curved surface S01 to the end on the other side Z2 of the metal plate 121 in the first direction. The interval between the side surfaces S02 and S03 in the third direction Y is larger than the chord length of the arc L01.

The receiving portion 1211B may have a shape in which the receiving portion 1211A is translated by a first predetermined distance in the other side Y2 of the third direction. Therefore, details of the receiving portion 1211B will be omitted.

The receiving portion 1221A is a curved surface S11 forming an arc L11 in plan view from the second direction X at an end portion on the other side Z2 in the first direction. The arc L11 faces the one side Z1 of the first direction. The central angle and the chord of the arc L11 are the same as those of the arc L01. When the metal plates 121 and 122 are exactly overlapped, the arc L01 and the arc L11 form a circle. The receiving portion 1221A further includes side surfaces S12 and S13 extending from both ends of the curved surface S11 to an end on one side Z1 of the metal plate 122 in the first direction.

The receiving portion 1221B may have a shape in which the receiving portion 1221A is translated by a second predetermined distance in the other side Y2 of the third direction. Therefore, details of the receiving portion 1221B will be omitted. Therefore, when the metal plates 121 and 122 are exactly overlapped, the receiving portions 1221A and 1221B form a circle in plan view from the second direction X.

When the joint assembly 1 is assembled, the receiving portions 1211A and 1221A sandwich the intermediate portion 113 of the joint 11A from one side and the other side in the second intersecting direction D03. The receiving portions 1211A and 1221A receive the intermediate portion 113 at the curved surfaces S01 and S11 (particularly refer to FIGS. 4 and 5). Similarly, the receiving portions 1211B and 1221B receive the intermediate portion 113 of the joint 11B. Then, the metal plates 121 and 122 are fastened by a screw 123 in a state in which metal plates 121 and 122 are tightly overlapped. The joint 11 is supported by the fixing portion 12 with a simple structure by the receiving portions 1211 and 1221 having the above-described shapes. In addition, since the joints 11A and 11B are fixed in the first intersecting direction D01 at the fixing portion 12, the joint assembly 1 can be easily assembled to the chassis 120, and the flow path members 3 and 4 can be easily routed in the chassis 120.

Figure 8:
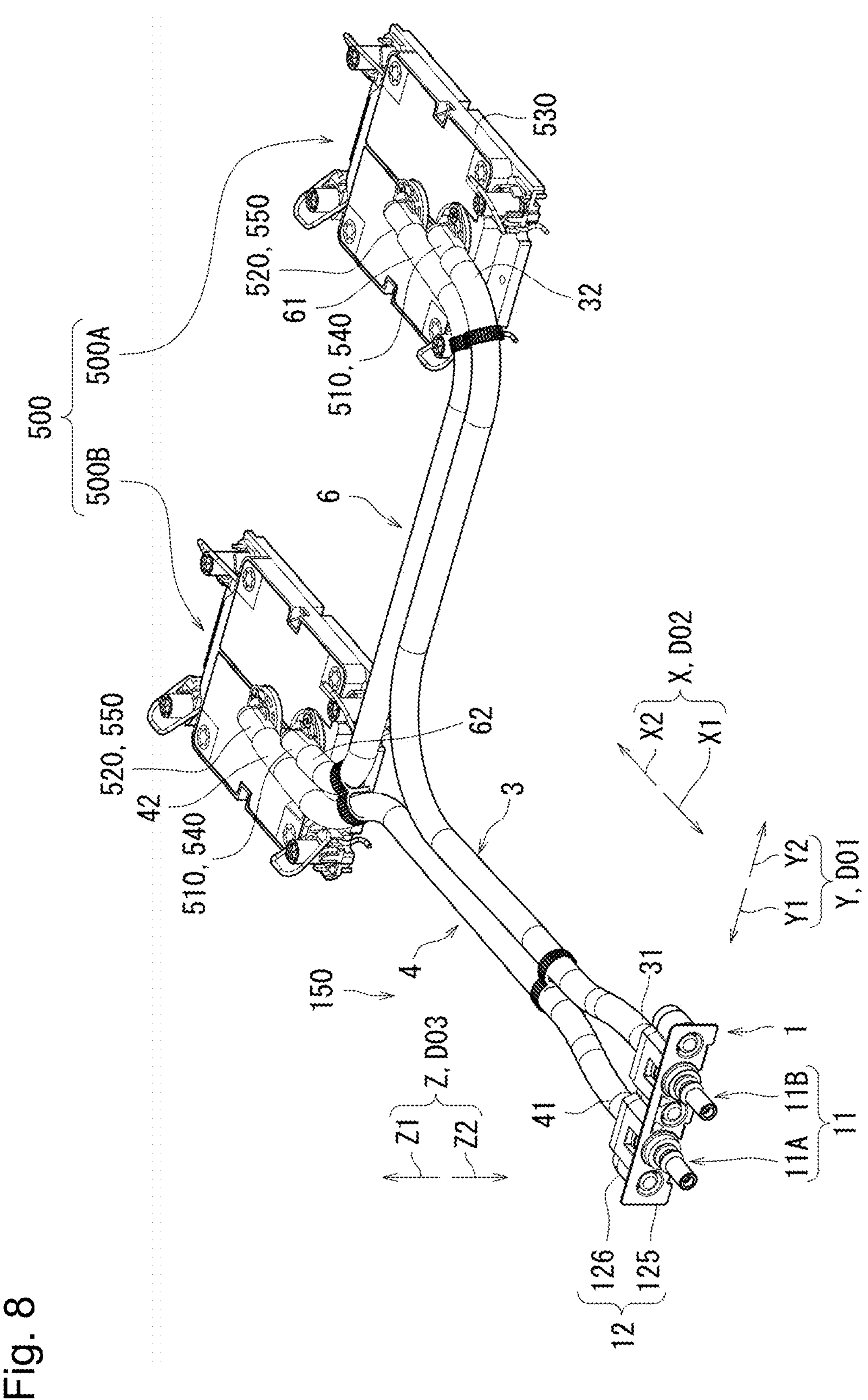
FIG. 8 is a perspective view illustrating a joint assembly and its periphery according to a second example embodiment of the present disclosure.
Figure 9:
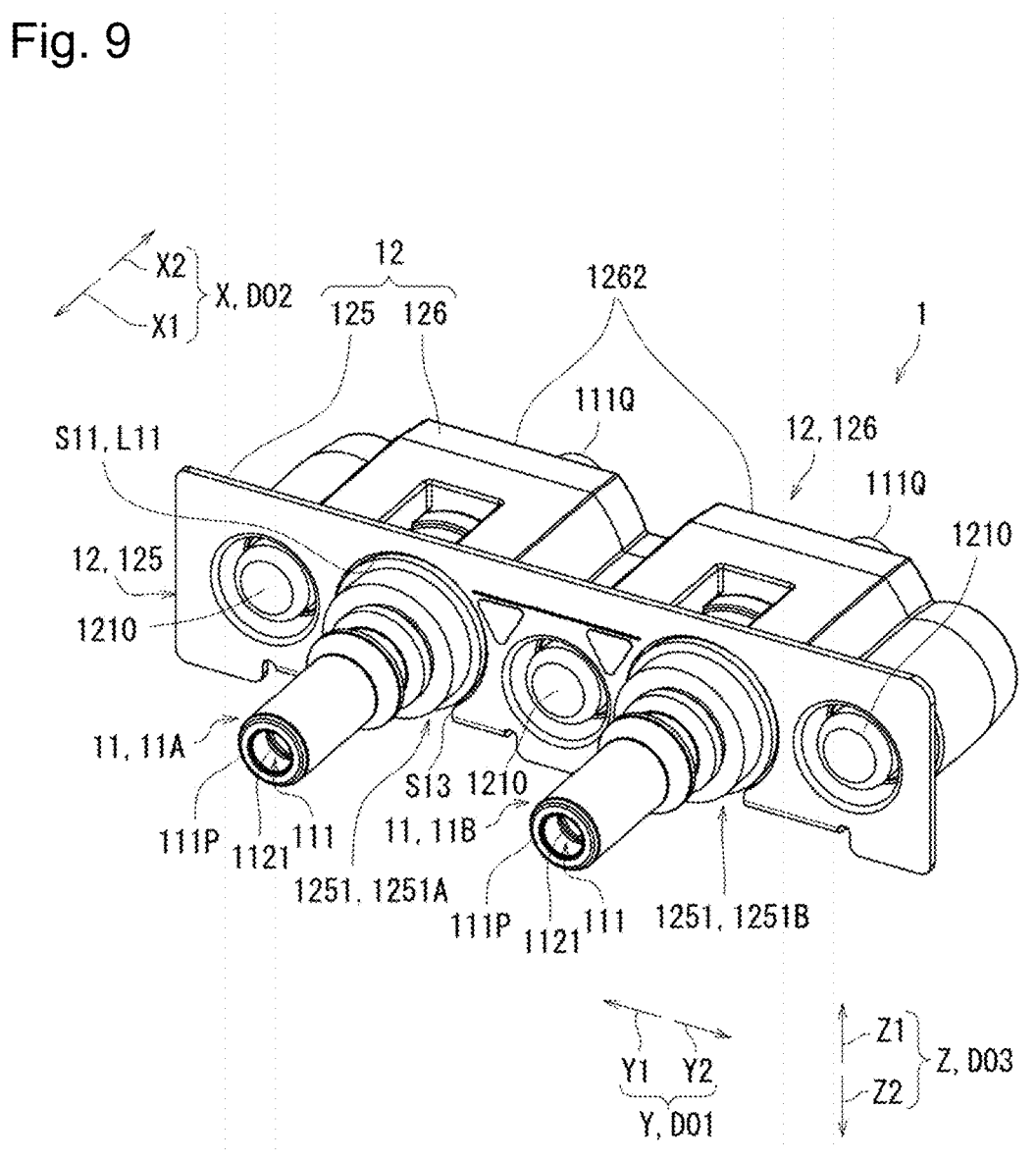
Figure 10:
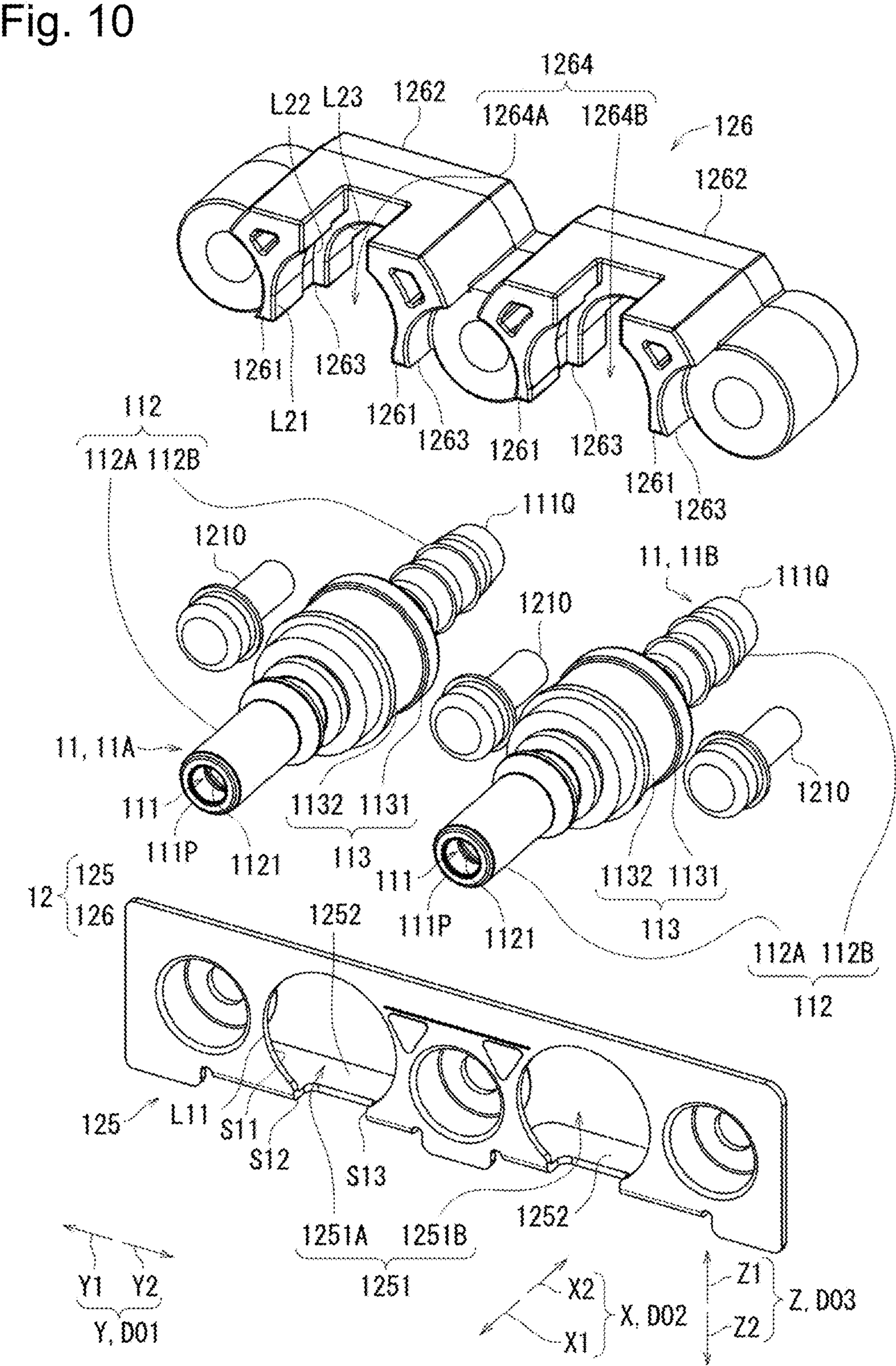
FIG. 10 is an exploded view of the joint assembly illustrated in FIG. 9.

FIG. 8 is a perspective view illustrating the joint assembly 1 and its periphery according to the second example embodiment. FIG. 9 is an enlarged view of the joint assembly 1 illustrated in FIG. 8. FIG. 10 is an exploded view of the joint assembly 1 illustrated in FIG. 9.

Prior to description of the joint assembly 1, the cold plate 500 will be described in more detail. As illustrated in FIG. 8, the pair of two cold plates 500 includes cold plates 500A and 500B. The cold plates 500A and 500B are similar to those of the first example embodiment, and thus, detailed descriptions thereof will be omitted.

As illustrated in FIGS. 8 to 10, the joint assembly 1 includes at least one joint 11 and a fixing portion 12 as components as in the first example embodiment. The at least one joint 11 is two joints 11A and 11B as in the first example embodiment.

Each joint 11 has at least two mounting portions 112 and an intermediate portion 113 as in the first example embodiment. As in the first example embodiment, the at least two mounting portions 112 are two mounting portions 112A and 112B. Each of the mounting portions 112A and 112B is different from the first example embodiment in the following points.

The mounting portion 112A is a coupling socket, and further includes a valve 1121 in the flow path 111.

As in the first example embodiment, the flow path members 2 to 5 are mounted to the four mounting portions 112. However, a coupling plug (not shown) attached to the other end 51 (see FIG. 3) of the flow path member 5 is mounted to the mounting portion 112A (that is, the coupling socket) of the joint 11A. A coupling plug (not shown) attached to the other end 21 (see FIG. 3) of the flow path member 2 is mounted to the mounting portion 112A of the joint 11B. That is, the flow path members 5 and 2 each are mounted to the mounting portions 112A of the joints 11A and 11B via the coupling plugs. Therefore, the description "the flow path members 2 to 5 are mounted to the mounting portion 112" of the present disclosure includes a concept "the flow path members 2 to 5 are directly mounted to the mounting portion 112" and a concept "the flow path members 2 to 5 are mounted to the mounting portion 112 via the coupling". The valve 1121 provided in the flow path 111 of each mounting portion 112A is opened according to the mounting of the coupling plug. On the other hand, the valve 1121 of each mounting portion 112A is closed according to the detachment of the coupling plug.

In each joint 11, the intermediate portion 113 is different from the first example embodiment in that it includes a large diameter portion 1131 and a small diameter portion 1132.

The large diameter portion 1131 and the small diameter portion 1132 are arranged in the extending direction D02. Specifically, the small diameter portion 1132 is located adjacent to the large diameter portion 1131 in the extending direction D02. As described above, the extending direction D02 is a direction along the second direction X. More specifically, the small diameter portion 1132 is adjacent to the large diameter portion 1131 in the one side X1 of the second direction.

Each of the large diameter portion 1131 and the small diameter portion 1132 has a substantially cylindrical shape sharing the central axis. The large diameter portion 1131 has a predetermined diameter and a predetermined height. The height is a dimension in the second direction X. The small diameter portion 1132 is smaller in diameter than the large diameter portion 1131. The small diameter portion 1132 has a height higher than that of the large diameter portion 1131. Each diameter of the large diameter portion 1131 and the small diameter portion 1132 is larger than the maximum diameter of each mounting portion 112 (particularly see FIGS. 10 and 12).

The fixing portion 12 is different from the first example embodiment in that it includes a metal plate 125 and a main body 126.

The metal plate 125 is made of metal and extends in the first direction Z and the third direction Y. In the second example embodiment, the dimension of the metal plate 125 in the first direction Z is substantially the same as the dimension of the opening 140 (see FIG. 2) in the same direction. The dimension of the metal plate 125 in the third direction Y is substantially the same as the dimension of the opening 140 in the same direction.

The metal plate 125 has through-holes 1251A and 1251B as the same number of through-holes 1251 as the joints 11. As clearly illustrated in FIG. 10, each through-hole 1251 is formed by press working and penetrates the metal plate 125 in the extending direction D02. Specifically, the through-hole 1251A has a curved surface S11. The curved surface S11 has an arc L11 that is substantially circular in plan view from the second direction X. The central angle of the arc L11 is an angle close to 360°. The diameter of the arc L11 is substantially the same as the diameter of the small diameter portion 1132. The through-hole 1251A further includes side surfaces S12 and S13 extending from both ends of the curved surface S11 to the end on the other side Z2 of the metal plate 125 in the first direction.

The through-hole 1251B may have a shape in which the through-hole 1251A is translated by a second predetermined distance in the other side Y2 of the third direction. Therefore, details of the through-hole 1251B will be omitted.

The fixing portion 12 further includes a release prevention portion 1252 on the metal plate 125. Specifically, the release prevention portion 1252 is integral with the metal plate 125 and protrudes from the other side Z2 of the first direction to the other side X2 of the second direction with respect to the through-holes 1251 in the metal plate 125. The release prevention portion 1252 has a plate shape extending in the second direction X and the third direction Y.

The main body 126 is, for example, a molded article made of synthetic resin. The main body 126 has a long dimension in the second direction X. Specifically, the dimension of the main body 126 in the second direction X is larger than the dimensions in the first direction Z and the third direction Y.

The main body 126 has a plurality of end faces 1261, a plurality of end faces 1262, and a plurality of end faces 1263. Each end face 1261 defines an end of the main body 126 on the one side X1 of the second direction. The end faces 1261 are flat faces extending in the first direction Z and the third direction Y, and are flush with each other. The term "flush" means parallel without a step. Each end face 1262 defines an end of the main body 126 on the other side X2 in the second direction. Each end face 1262 is located away from each end face 1261 in the other side X2 of the second direction and is substantially parallel to each end face 1261. Each end face 1263 defines an end of the main body 126 on the other side Z2 in the first direction. The end faces 1263 are flat surfaces extending in the second direction X and the third direction Y, and are flush with each other.

Figure 11:
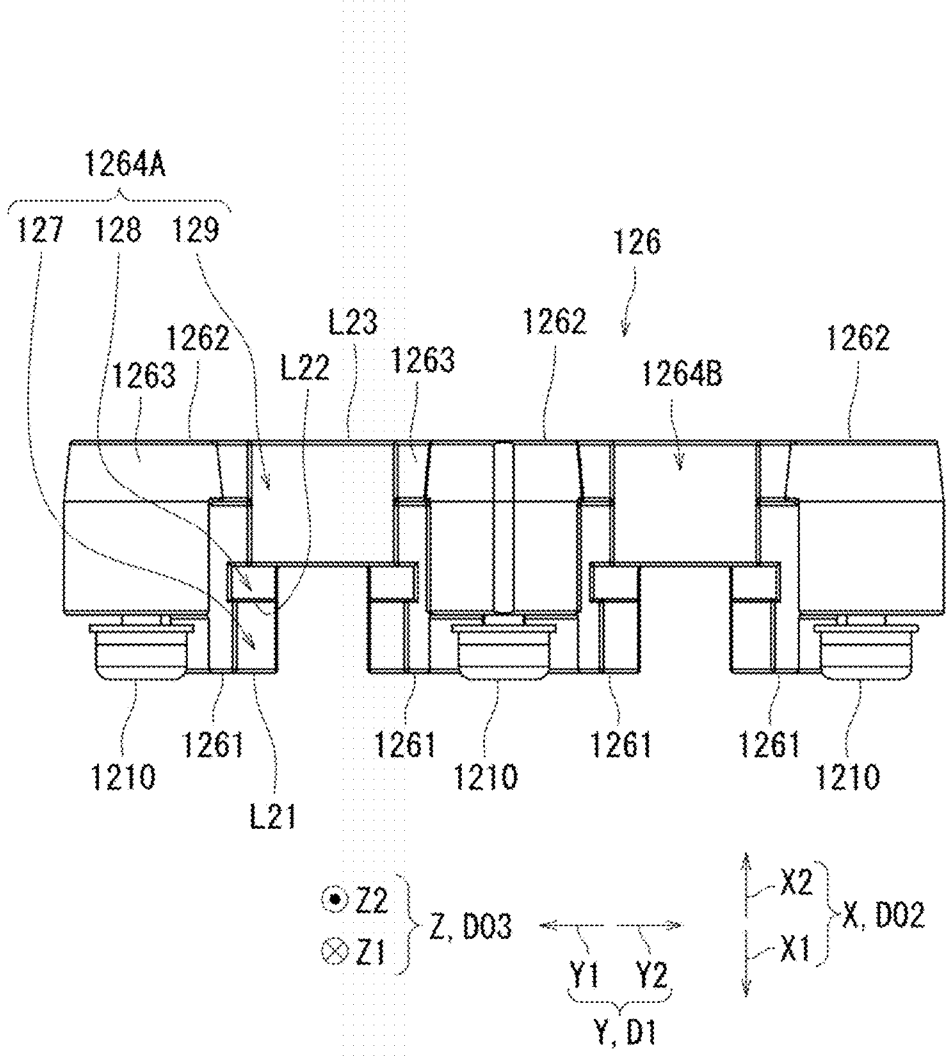
FIG. 11 is a view of a main body illustrated in FIG. 10 as viewed from the other side Z2 in a first direction.

The main body 126 further includes recesses 1264A and 1264B as the same number of recesses 1264 as the joints 11. As illustrated in FIGS. 10 and 11, the recess 1264A is recessed from each end face 1263 toward the one side Z1 of the first direction. That is, the recess 1264A is opened toward the other side Z2 of the first direction. The recess 1264A extends along the extending direction D02 from the end face 1261 to the end face 1262. Specifically, the recess 1264A further includes receiving portions 127, 128, and 129. The receiving portions 127 and 128 are other examples of the "second receiving portion" and the "first receiving portion" of the present disclosure.

The receiving portion 127 is located closest to the one side X1 of the second direction in the receiving portions 127, 128, and 129. The shape of the receiving portion 127 is an arc L21 in plan view from the second direction X. The arc L21 has the same diameter as the small diameter portion 1132 and has a central angle of 180°. The receiving portion 127 extends in the second direction X from the end face 1261. The receiving portion 127 has the same dimension as the small diameter portion 1132 in the second direction X.

The receiving portion 128 is adjacent to the receiving portion 127 on the other side X2 in the second direction. The shape of the receiving portion 128 is an arc L22 in plan view from the second direction X. The arc L22 has the same diameter as the large diameter portion 1131 and has a central angle of 180°. The arcs L21 and L22 share the center. The receiving portion 128 has the same dimension as the large diameter portion 1131 in the second direction X.

The receiving portion 129 is adjacent to the receiving portion 128 on the other side X2 in the second direction, extends in the second direction X, and reaches the end face 1262. The shape of the receiving portion 129 is an arc L23 in plan view from the second direction X. The arc L23 is smaller than the diameter of the small diameter portion 1132 and larger than the diameter of the mounting portion 112. The arc L23 shares the center with the arcs L21 and L22 and has a central angle of 180°.

The recess 1264B may have a shape obtained by translating the recess 1264A by a second predetermined distance in the other side Y2 of the third direction. Therefore, details of the recess 1264B will be omitted.

Figure 12:
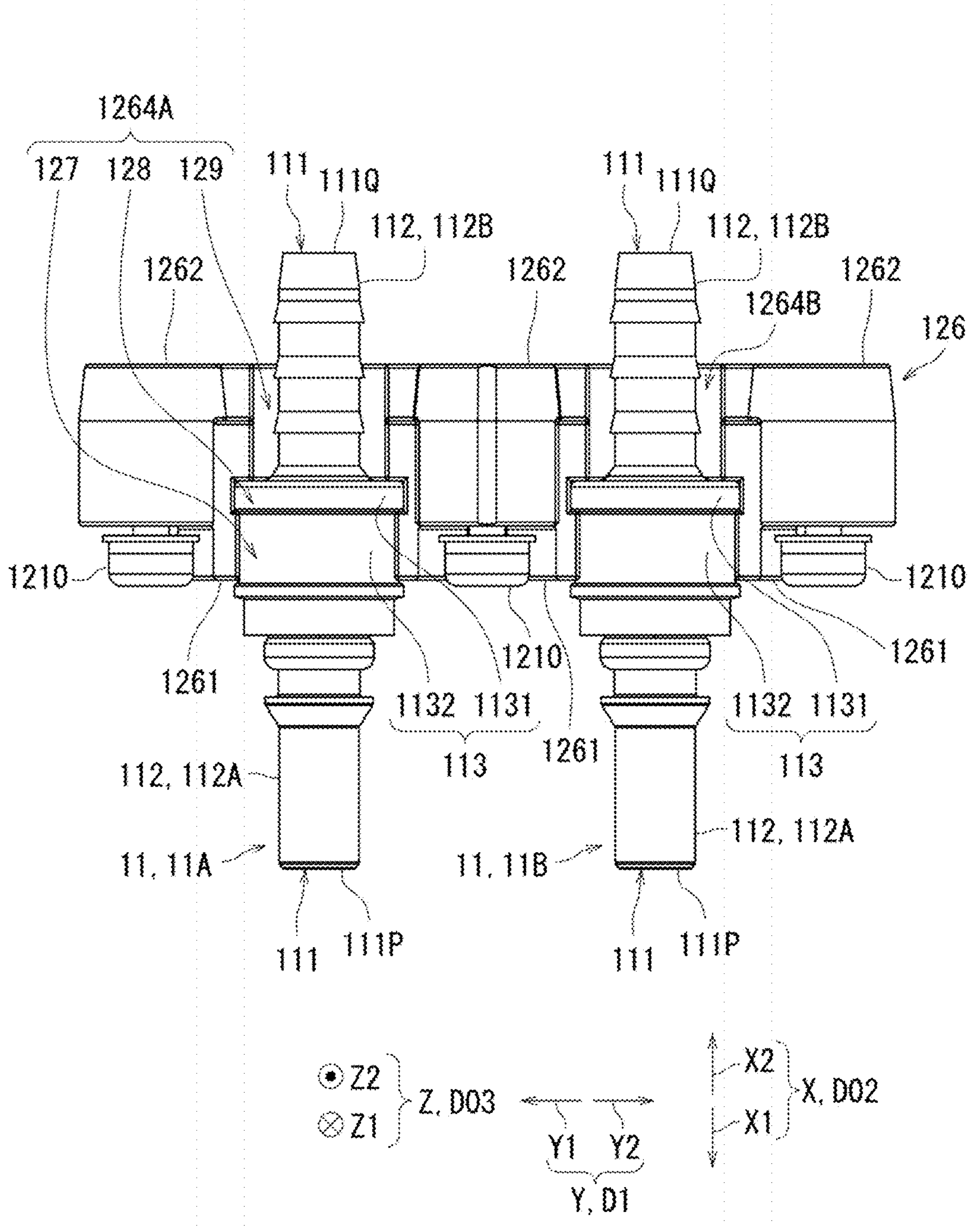
FIG. 12 is a view illustrating a state in which the joint is fitted into the main body illustrated in FIG. 11.

In assembling the joint assembly 1, the joints 11A and 11B are fitted into the recesses 1264A and 1264B (see FIG. 12). In other words, in the recesses 1264A and 1264B, the receiving portion 127 to 129 receives the joints 11A and 11B from the other side in the second intersecting direction D03. Specifically, each of the receiving portions 127 and 128 receives the small diameter portion 1132 and the large diameter portion 1131 from the other side in the second intersecting direction D03 (particularly see FIGS. 10 and 12). The joints 11A and 11B can be supported by the receiving portions 127 and 128, and the joints 11A and 11B can be easily located in the first direction Z, the second direction X, and the third direction Y.

Further, the metal plate 125 is fastened to the end face 1261 of the main body 126 by a screw 1210 in a state in which the mounting portions 112A of the joints 11A and 11B are inserted into through-holes 1251A and 1251B of the metal plate 125. Therefore, in the metal plate 125, the edges of the through-holes 1251A and 1251B abut on the joints 11A and 11B. As a result, the joint 11 is less likely to fall off from the fixing portion 12. In addition, since the joints 11A and 11B are arranged in the first intersecting direction D01 at the fixing portion 12, the joint assembly 1 can be easily assembled to the chassis 120, and the flow path members 3 and 4 can be easily routed in the chassis 120.

When the joint assembly 1 is assembled, the release prevention portion 1252 overlaps at least a part of the recesses 1264A and 1264B in the first direction Z. Therefore, when the mounting portion 112A is inserted into each of the through-holes 1251 by the release prevention portion 1252, the joints 11A and 11B are less likely to fall off from each of the through-holes 1251.

The drawings schematically show each component mainly in order to facilitate understanding of the present disclosure, and the thickness, length, number, interval, and the like of each component that is shown may be different from the actual ones for convenience of the drawings. The configuration of each component shown in the above example embodiment is an example and is not particularly limited, and it goes without saying that various modifications can be made without substantially departing from the effects of the present disclosure.

The present technology can also adopt the following configurations.

(1) A joint assembly including: a joint that includes a flow path penetrating through the joint; and a fixing portion to which the joint is attached, in which the joint includes at least two mounting portions to which a tube is mounted, and an intermediate portion that is located between the at least two mounting portions, and the fixing portion extends in a first intersecting direction intersecting the flow path and abuts on the intermediate portion.

(2) The joint assembly according to (1), in which the joint further includes a protruding portion that protrudes in the first intersecting direction from between the intermediate portion and one of the at least two mounting portions.

(3) The joint assembly according to (1), in which the joint further includes at least two protruding portions that protrudes in the first intersecting direction from between the intermediate portion and the at least two mounting portions, and the fixing portion is located between the two protruding portions and abuts on the intermediate portion located between the two protruding portions.

(4) The joint assembly according to any one of (1) to (3), in which the fixing portion includes a first metal plate and a second metal plate that extend in the first intersecting direction, the first metal plate includes a first receiving portion to receive the intermediate portion from one side in a second intersecting direction intersecting the flow path, and the second metal plate includes a second receiving portion to receive the intermediate portion from another side in the second intersecting direction.

(5) The joint assembly according to any one of (1) to (4), in which the intermediate portion includes a large diameter portion that has a predetermined diameter, and a small diameter portion that is located adjacent to the large diameter portion in an extending direction along the flow path and has a smaller diameter than the large diameter portion, and the fixing portion includes a first receiving portion to receive the large diameter portion from another side in a second intersecting direction intersecting the flow path, and a second receiving portion to receive the small diameter portion from another side in the second intersecting direction.

(6) The joint assembly according to (5), in which the fixing portion further includes a metal plate that includes a through-hole through which the mounting portion is inserted, and an edge of the through-hole abutting on the joint.

The joint assembly according to the present disclosure has industrial applicability.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A joint assembly comprising:

a joint that includes a flow path penetrating through the joint; and a fixing portion to which the joint is attached; wherein the joint includes:

at least two mounting portions to which a tube is mounted; and an intermediate portion that is located between the at least two mounting portions;

the fixing portion extends in a first intersecting direction intersecting the flow path and abuts on the intermediate portion;

the fixing portion includes a first metal plate and a second metal plate that extend in the first intersecting direction;

the first metal plate and the second metal plate each respectively include one of a pair of overlapping portions that overlap one another in a direction extending in parallel with the flow path;

through holes are defined to extend continuously through the pair of overlapping portions of the first metal plate and the second metal plate;

the first metal plate includes a first receiving portion contacting and receiving the intermediate portion from one side in a second intersecting direction intersecting the flow path; and the second metal plate includes a second receiving portion contacting and receiving the intermediate portion from another side in the second intersecting direction.

2. The joint assembly according to claim 1, wherein the joint further includes a protruding portion that protrudes in the first intersecting direction from between the intermediate portion and one of the at least two mounting portions.

3. The joint assembly according to claim 1, wherein the joint further includes at least two protruding portions that protrudes in the first intersecting direction from between the intermediate portion and the at least two mounting portions; and the fixing portion is located between the two protruding portions and abuts on the intermediate portion located between the two protruding portions.

4. The joint assembly according to claim 1, wherein the intermediate portion includes:

a large diameter portion that has a predetermined diameter; and a small diameter portion that is located adjacent to the large diameter portion in an extending direction along the flow path and has a smaller diameter than the large diameter portion; and the fixing portion includes:

the first receiving portion contacting and receiving the large diameter portion; and the second receiving portion contacting and receiving the small diameter portion.

5. The joint assembly according to claim 4, wherein the fixing portion further includes a metal plate that includes a through-hole through which the mounting portion is inserted, and an edge of the through-hole abutting on the joint.

6. A cooling system comprising:

a coolant distribution unit;

a cold plate; and the joint assembly according to claim 4.

7. A cooling system comprising:

a coolant distribution unit;

a cold plate; and the joint assembly according to claim 1.

8. The joint assembly according to claim 1, wherein an outermost circumferential surface of the intermediate portion contacts both of the first metal plate and the second metal plate.

9. The joint assembly according to claim 1, wherein an outermost circumferential surface of the intermediate portion contacts both of the first metal plate and the second metal plate at directly adjacent locations along the direction extending in parallel with the flow path.

10. A joint assembly, comprising:

a joint that includes a flow path penetrating through the joint; and a fixing portion to which the joint is attached; wherein the joint includes:

at least two mounting portions to which a tube is mounted; and an intermediate portion that is located between the at least two mounting portions;

the fixing portion extends in a first intersecting direction intersecting the flow path and abuts on the intermediate portion;

the intermediate portion includes:

a large diameter portion that has a predetermined diameter; and a small diameter portion that is located adjacent to the large diameter portion in an extending direction along the flow path and has a smaller diameter than the large diameter portion;

the fixing portion includes; a first metal plate and a second metal plate that extend in the first intersecting direction;

the first metal plate and the second metal plate each respectively include one of a pair of overlapping portions that overlap one another in a direction extending in parallel with the flow path:

through holes are defined to extend continuously through the pair of overlapping portions of the first metal plate and the second metal plate;

the first metal plate includes a first receiving portion contacting and receiving the large diameter portion from another side in a second intersecting direction intersecting the flow path; and the second metal plate includes a second receiving portion contacting and receiving the small diameter portion from another side in the second intersecting direction.

11. The joint assembly according to claim 10, wherein the fixing portion further includes a metal plate that includes a through-hole through which the mounting portion is inserted, and an edge of the through-hole abutting on the joint.

* * * * *